(12) United States Patent
Tenegal

(10) Patent No.: US 9,919,816 B2
(45) Date of Patent: Mar. 20, 2018

(54) VALVE AND SEALED CONTAINER FOR SUBMICRON PARTICLES, AND METHOD FOR USING SAME

(75) Inventor: Francois Tenegal, Paris (FR)

(73) Assignee: NANOMAKERS, Rambouillet (FR)

( * ) Notice: Subject to any disclaimer, the term of this patent is extended or adjusted under 35 U.S.C. 154(b) by 906 days.

(21) Appl. No.: 14/360,730

(22) PCT Filed: Nov. 28, 2011

(86) PCT No.: PCT/FR2011/052797
§ 371 (c)(1),
(2), (4) Date: May 27, 2014

(87) PCT Pub. No.: WO2013/079809
PCT Pub. Date: Jun. 6, 2013

(65) Prior Publication Data
US 2015/0096269 A1   Apr. 9, 2015

(51) Int. Cl.
*B65D 85/00* (2006.01)
*B65B 1/04* (2006.01)
(Continued)

(52) U.S. Cl.
CPC ............... *B65B 1/04* (2013.01); *B65B 1/06* (2013.01); *B65B 1/16* (2013.01); *B65B 1/28* (2013.01);
(Continued)

(58) Field of Classification Search
CPC .... B65B 1/04; B65B 1/06; B65B 1/16; B65B 1/28; B65B 39/00; B65B 39/001; B65B 39/002; B65B 69/00; B65B 69/0075; B65D 85/70; B65G 69/183

USPC ...... 53/431, 432, 467, 468, 471, 492; 141/7, 141/65, 383–386; 220/4.28; 222/196, 222/185.1
See application file for complete search history.

(56) References Cited

U.S. PATENT DOCUMENTS 2,284,551 A * 5/1942 Alexander ............ B65B 31/025
206/213.1
3,212,537 A * 10/1965 Hinxlage ................. B67C 3/10
141/39
(Continued)

FOREIGN PATENT DOCUMENTS

EP   0619254 A1   10/1994
EP   0747307 A1   12/1996
(Continued)

OTHER PUBLICATIONS

International Search Report, dated Aug. 7, 2012, from corresponding PCT application.

*Primary Examiner* — Hemant M Desai
*Assistant Examiner* — Mobeen Ahmed
(74) *Attorney, Agent, or Firm* — Young & Thompson

(57) ABSTRACT

A container with improved sealing, for improved security in the event of loading, transporting and/or unloading submicron particles, in particular nanopowder/nanoparticles, includes a connector for injecting liquid and/or gas. Such a container can also contain at least one inflatable seal (40) valve (3; 4). The container is provided with elements for changing the physical state of the material by heating, mixing or ultrasound bombardment. A method for using the container and an inflatable seal valve are also described.

26 Claims, 7 Drawing Sheets

Figure 2:
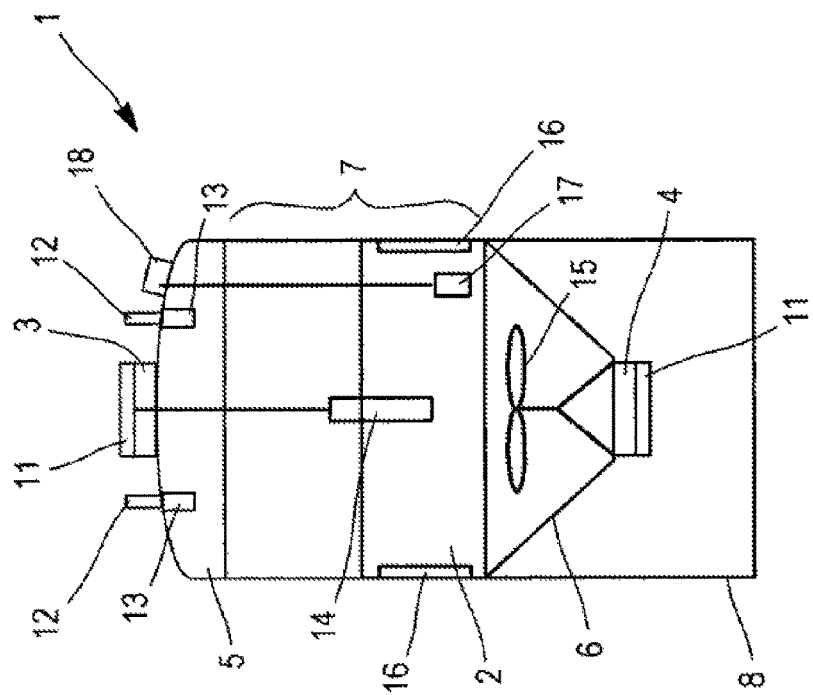

(51) Int. Cl.
  *B65B 39/00* (2006.01)
  *B65B 1/16* (2006.01)
  *B65B 69/00* (2006.01)
  *B65B 1/28* (2006.01)
  *B65B 1/06* (2006.01)
  *B65G 69/18* (2006.01)

(52) U.S. Cl.
  CPC ............ *B65B 39/00* (2013.01); *B65B 39/001* (2013.01); *B65B 39/002* (2013.01); *B65B 69/00* (2013.01); *B65B 69/0075* (2013.01); *B65D 85/70* (2013.01); *B65G 69/183* (2013.01)

(56) References Cited

U.S. PATENT DOCUMENTS

| | | | | |
|---|---|---|---|---|
| 3,538,961 | A * | 11/1970 | Bruce | B60H 1/00585 141/61 |
| 5,540,266 | A | 7/1996 | Grau et al. | |
| 5,586,748 | A * | 12/1996 | Kish | F16L 37/36 137/614.04 |
| 5,690,152 | A | 11/1997 | Koch et al. | |
| 5,718,270 | A | 2/1998 | Grau et al. | |
| 5,884,660 | A * | 3/1999 | Cathrein | B65B 39/002 137/614.01 |
| 5,961,000 | A * | 10/1999 | Sanfilippo | B65B 31/00 141/47 |
| 6,588,807 | B1 * | 7/2003 | Burke | F16L 37/144 285/1 |
| 7,677,411 | B2 * | 3/2010 | Crowder | A61M 15/0045 198/533 |
| 8,613,297 | B2 * | 12/2013 | Adams | F16K 15/063 141/20 |
| 2001/0049867 | A1 * | 12/2001 | Tseng | A61G 17/00 27/1 |
| 2004/0078033 | A1 * | 4/2004 | Levin | A61B 18/02 606/20 |
| 2004/0079749 | A1 * | 4/2004 | Young | F24H 9/2021 219/486 |
| 2004/0088065 | A1 * | 5/2004 | Robitaille | G05B 19/41865 700/95 |
| 2007/0122257 | A1 * | 5/2007 | Bauer | B65D 88/30 414/288 |
| 2008/0006636 | A1 * | 1/2008 | Wild | B65D 77/061 220/495.06 |
| 2008/0078466 | A1 * | 4/2008 | Wang | B65D 81/2038 141/65 |
| 2008/0105319 | A1 * | 5/2008 | Aniban, Jr. | A01M 21/043 137/899.4 |
| 2008/0305257 | A1 * | 12/2008 | Tenegal | B01D 47/16 427/217 |
| 2009/0194189 | A1 * | 8/2009 | Bordere | B65B 1/28 141/2 |
| 2010/0018853 | A1 * | 1/2010 | Robinson | B01J 2/02 204/157.62 |
| 2010/0155626 | A1 * | 6/2010 | Dougherty | G21F 5/06 250/507.1 |
| 2011/0005832 | A1 * | 1/2011 | McDonald | E21B 21/065 175/5 |
| 2011/0048541 | A1 * | 3/2011 | Wehrli | B28C 7/0007 137/1 |
| 2012/0037232 | A1 * | 2/2012 | Shen | B01F 11/0266 137/1 |
| 2012/0178877 | A1 * | 7/2012 | Rathje | B82Y 30/00 524/770 |
| 2016/0046480 | A1 * | 2/2016 | Haaland | F17C 11/005 141/11 |
| 2016/0081828 | A1 * | 3/2016 | Pacetti | A61F 2/86 141/65 |

FOREIGN PATENT DOCUMENTS

| | | |
|---|---|---|
| EP | 2085312 A1 | 8/2009 |
| JP | 62-230889 A | 10/1987 |
| JP | H06-321360 A | 11/1994 |
| JP | H-8-49954 A | 2/1996 |
| JP | H09-2418 A | 1/1997 |
| JP | H09-2669 A | 1/1997 |
| JP | 11-63346 A | 5/1999 |
| JP | 2003-300716 A | 10/2003 |
| JP | 2004-182460 A | 7/2004 |
| JP | 2007-145432 A | 6/2007 |
| JP | 2009-184911 A | 8/2009 |
| WO | 201147872 A1 | 4/2011 |

* cited by examiner

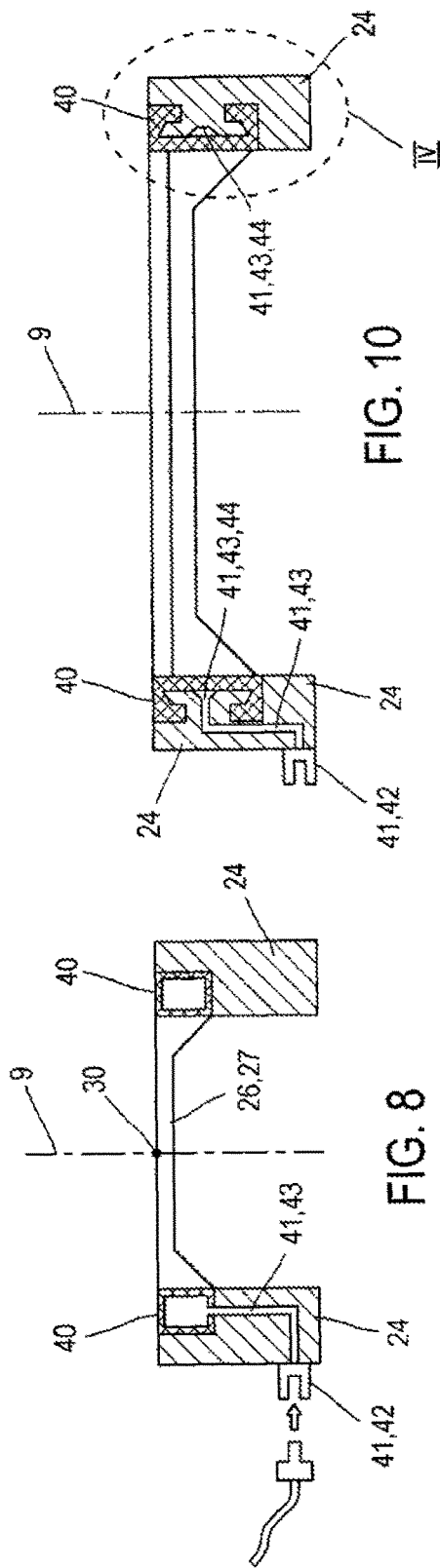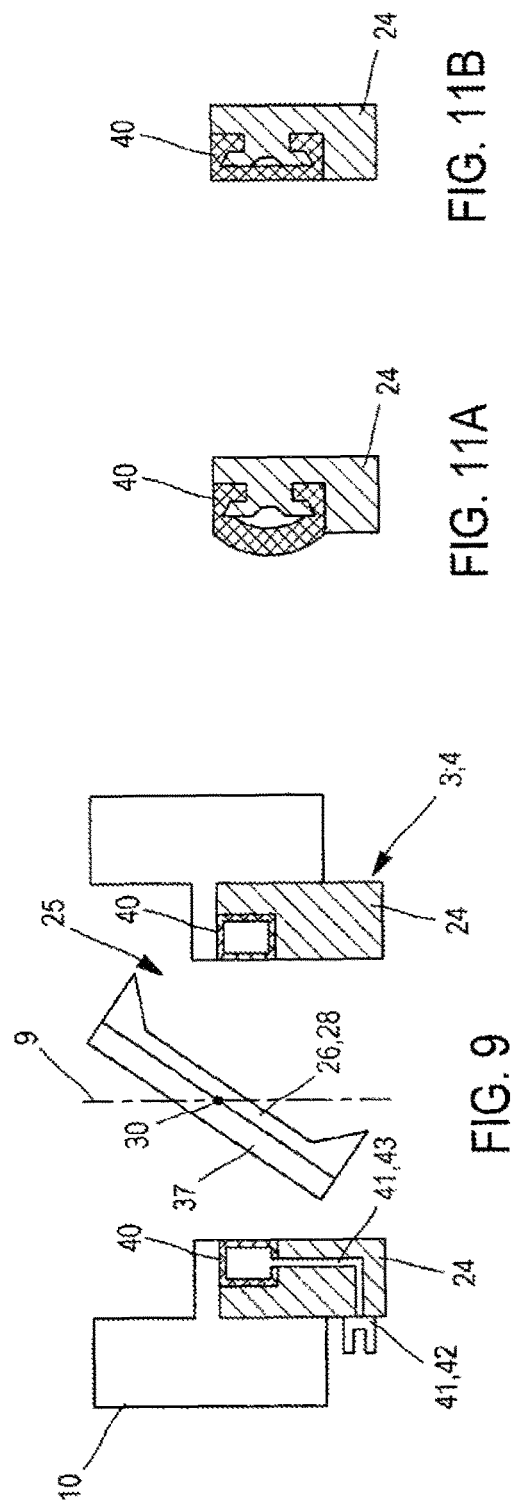

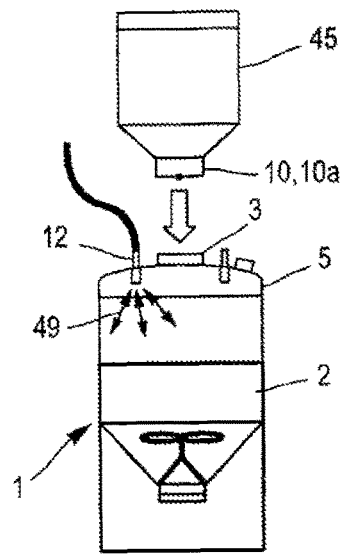 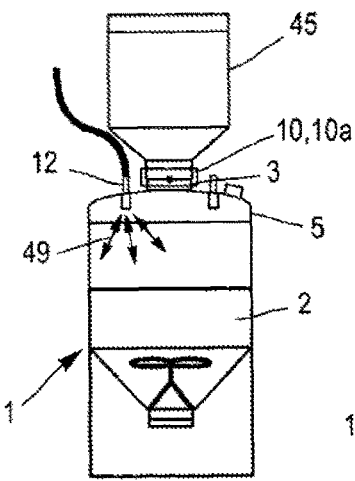 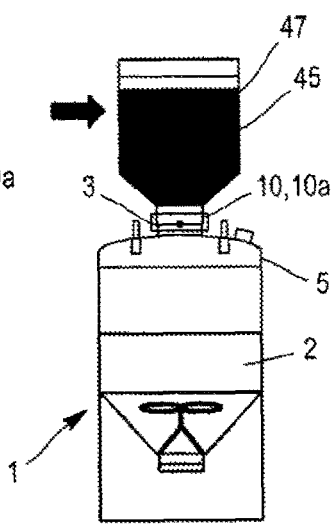
FIG. 12  FIG. 13  FIG. 14
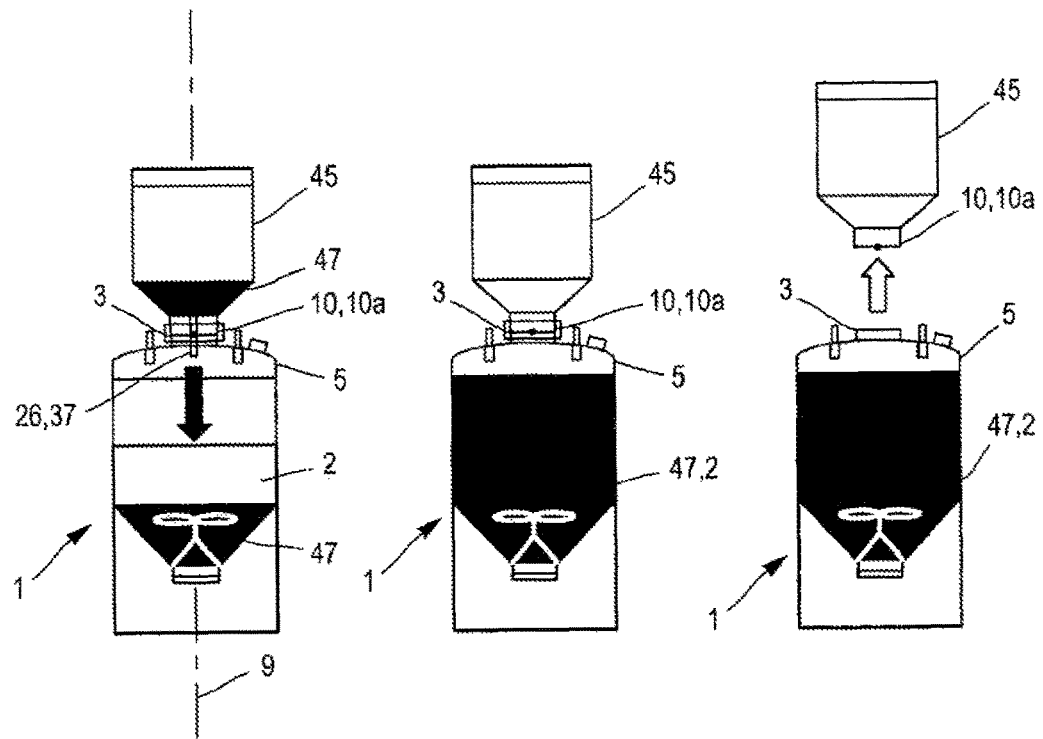
FIG. 15  FIG. 16  FIG. 17

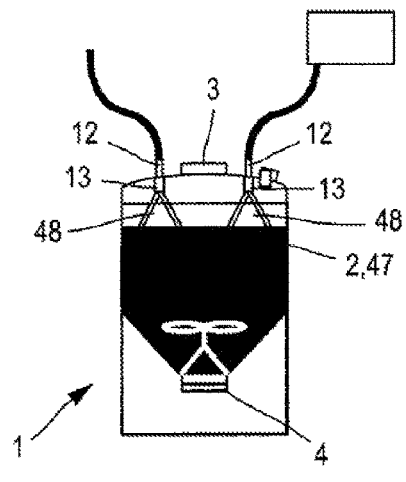
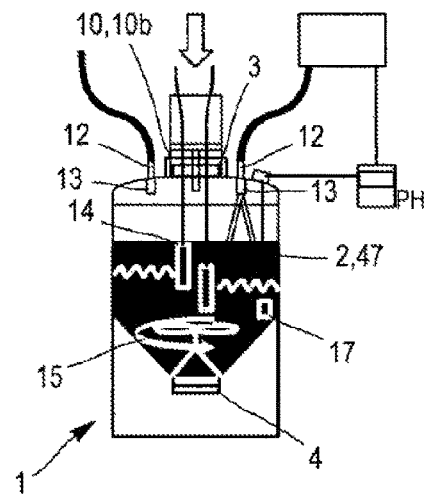
FIG. 18  FIG. 19
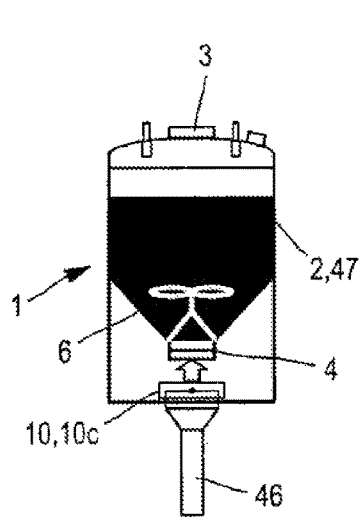
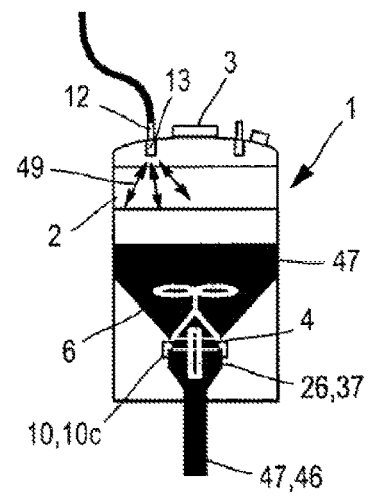
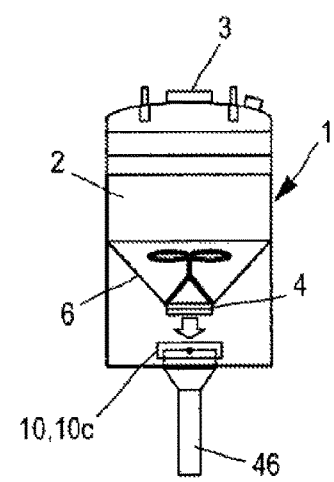
FIG. 20  FIG. 21  FIG. 22

US 9,919,816 B2

VALVE AND SEALED CONTAINER FOR SUBMICRON PARTICLES, AND METHOD FOR USING SAME

TECHNICAL FIELD

The present invention relates to a container. It also relates to a valve associated with such a container. It further relates to a process for using such a container.

The field of the invention is more particularly that of submicron particles. In particular, but non-limitatively, the field of the invention is preferably that of nanometric powders or nanopowders or even nanoparticles. The container, the valve and the process according to the invention make it possible to ensure increased safety for a user by limiting as far as possible all contact of this user with the particles contained in the container according to the invention or isolated by a valve according to the invention.

STATE OF THE PRIOR ART

Double-valve devices are known (for example of the "Buck®" type, such as described for example in documents U.S. Pat. Nos. 5,690,152, 5,718,270 and 5,540,266), providing good hermeticity and good safety for transporting macroscopic objects such as pharmaceutical granules.

Moreover, a process is known for filling a container or recipient by means of such a double-valve device, as described for example in document EP 2 085 312 B1. The container contains one of the two valves of the double-valve device.

Many problems are posed by such a process of filling or by such a container according to the prior art:
  safety is not optimum, in particular when the container comprises submicron particles or nanopowders, the container then no longer being perfectly hermetic, in particular when pressure differences greater than 400 mbar occur between the container and the external environment or the process to which it is connected;
  the use of such a container is not very convenient, and may require many steps of handling the container and/or of the particles before or during filling the container, or during or after emptying from the container.

The purpose of the invention is to solve at least one of the following technical problems:
  improve the hermeticity of the container or more generally of the valve of the container, and/or
  reduce the number of steps of handling the container and/or of the particles before or during filling the container, or during or after emptying from the container.

DISCLOSURE OF THE INVENTION

This purpose is achieved with a container, characterized in that it comprises:
  an internal storage space,
  a filling valve having an open state allowing objects (typically particles, preferably submicron particles) to pass through the filling valve between the internal space and the exterior of the container and a closed state preventing the objects (typically particles, preferably submicron particles) to enter or leave the internal space through the filling valve, said filling valve preferably being equipped with locking means arranged for locking the filling valve in its closed state and for preventing opening thereof when this filling valve is not connected to a filling pipe,
  an emptying valve (combined with or separate from the filling valve) having an open state allowing the objects (typically particles, preferably submicron particles) to pass through the emptying valve between the internal space and the exterior of the container and a closed state preventing the objects (typically particles, preferably submicron particles) to enter or leave the internal space through the emptying valve, said emptying valve preferably being equipped with locking means arranged for locking the emptying valve in its closed state and for preventing opening thereof when this emptying valve is not connected to an emptying pipe.

According to a first aspect of the invention, the container can further comprise a connector arranged to be open to allow passage of fluid through this connector between the exterior of the container and the internal space when it is connected to a complementary connector of a source or discharge of fluid and to be closed to prevent passage of fluid through this connector between the internal space and the exterior of the container when it is not connected to the complementary connector of the source or discharge of fluid.

The filling and emptying valves are then preferably separate and the connector is preferably located closer to the filling valve than to the emptying valve (typically on the filling valve side and not the emptying valve side with respect to the internal space).

The connector can be a quick connector (preferably from Staubli) consisting of a male part or of a female part arranged for connecting to an associated female or male part respectively, the particular feature of this type of connector being that the male and female parts are closed when they are disconnected and open when they are connected, thus allowing a fluid (gas, vapour, liquid) to pass in total safety and under optimum conditions of hermeticity. This fluid can go towards the exterior of the container (pumping) or towards the interior of the container. This quick connector can be connected (preferably for the part in contact with the nanopowder) to a filter, preferably of the HEPA type of type H14.

The connector can be connected (preferably during transport of the container) to a safety valve (as complementary connector) so as to form a system arranged to open when there is a pressure difference between the internal space and the exterior of the container above a threshold (typically comprised between 100 and 500 mbar, preferably roughly equal to 300 mbar).

According to another aspect of the invention, at least one (preferably both) of the filling valve and emptying valve can comprise a swivel plate, which:
  when the filling valve or emptying valve respectively is closed, is in a so-called "horizontal" state (with respect to the sealing plane of the valve) and seals the filling valve or the emptying valve respectively, preferably so that the axis of the plate coincides with the axis of the valve (axis of passage of the materials) and
  when the filling valve or emptying valve respectively is open, is in a swiveled state with respect to its horizontal state so that it no longer seals the filling valve or the emptying valve respectively and allows the objects (typically particles, preferably submicron particles) to pass through.

This filling or emptying valve respectively can optionally further comprise:
  a seal arranged to be in contact with at least one part of the perimeter of the swivel plate when the plate is in its horizontal state so as to ensure hermeticity of the filling valve or the emptying valve respectively when this valve is closed, and means for inflating the seal against the swivel plate in its closed state.

For each seal between that of the filling valve and/or of the emptying valve, the means for inflating this seal can be:
arranged to inflate the interior of the seal, the seal being hollow, and/or
arranged to inflate the seal against the swivel plate by inflating an intermediate space comprised between the seal and a part of the valve on which the seal is held.

According to another aspect of the invention, the container according to the invention can further comprise means for fixing a cover (also called "casing") on the filling valve and/or on the emptying valve, and/or a cover fixed on the filling valve and/or on the emptying valve.

At least one of (preferably each of) the filling valve and the emptying valve is equipped with clamping means (i.e. for fixing by clamping) allowing clamping (i.e. fixing by clamping) hermetically by means of a seal, a cover (also called "casing") on its swivel plate in its closed state.

The container according to the invention can comprise, for one or both of the filling valve and the emptying valve, means for creating a vacuum (pumping to lower the pressure) in the space located between the cover and the plate of this valve and/or monitoring means for displaying, from the exterior of the container, the pressure in the space located between the cover and the plate of this valve.

Each valve equipped with clamping means is preferably further equipped with means for creating a vacuum between its swivel plate and the cover (or casing) for example by means of a quick connector connected to a pump.

Each valve equipped with clamping means can optionally comprise monitoring means making it possible to check the hermeticity between the cover (casing) and its closed swivel plate. These monitoring means can be a small pressure gauge or a chip comprising a powder whose colour changes as a function of the pressure, said chip being visible from the exterior by means of a small inspection window and in contact with the space located between the casing and the swivel plate. Thus, once the clamp is closed and the space between the casing and the swivel plate is pumped out, the colour of the chip assumes a hue A. This hue remains stable for as long as the vacuum is maintained and changes colour if the vacuum between the casing and the swivel plate is broken for example following an impact during the transport phase. Preferably the powder produces a reversible effect as a function of the pressure: when the colour becomes B following ingress of air, it becomes A again when the pressure decreases again, for example after the space is pumped out again. The indicator can also be constituted by a membrane that is visible from outside the container and that is broken if air enters the space in question.

According to another aspect of the invention, the container according to the invention can further comprise means for changing in situ, in the internal space, the physical state of the objects (typically particles, preferably submicron particles) contained in the internal space.

The means for changing in situ, in the container, the state of the objects (typically particles, preferably submicron particles) contained in the internal space can comprise means for emitting ultrasound within the internal space.

The means for changing in situ, in the container, the state of the objects (typically particles, preferably submicron particles) contained in the internal space can comprise means for mixing the objects (typically particles, preferably submicron particles) contained in the internal space.

The mixing means are preferably located closer to the emptying valve than to the filling valve (typically on the emptying valve side and not on the filling valve side with respect to the internal space).

The means for changing in situ, in the container, the state of the objects (typically particles, preferably submicron particles) contained in the internal space can comprise means for heating or drying the objects (typically particles, preferably submicron particles) within the internal space.

According to another aspect of the invention, the container according to the invention can further comprise means for measuring at least one physical parameter of the objects (typically particles, preferably submicron particles) within the internal space.

According to another aspect of the invention, the container according to the invention can contain submicron particles in its internal space. The container according to the invention can contain submicron particles in its internal space occupying a volume of at least 70% of the volume of its internal space.

According to another aspect of the invention, the emptying valve and the filling valve are preferably located on two opposite sides of the container with respect to the internal space.

Moreover, a process for using a container according to the invention is proposed, characterized in that:
the container is filled with objects (typically particles, preferably submicron or nanometric particles), via its filling valve, at a filling site, then
the container is transported to an emptying site remote from the filling site, then
the objects (typically particles, preferably submicron or nanometric particles) are emptied from the container via its emptying valve, at the emptying site.

In the case when the container according to the invention comprises a connector as stated above:
before filling the container with particles, the internal space can be emptied via the connector, then the internal space can be flushed with gas (preferably neutral) via the connector, and/or
the container can be filled with dry particles, and the process according to the invention can further comprise an injection of liquid into the internal space via the connector prior to the emptying step, preferably until the particles are dissolved in the internal space, and/or gas can be injected into the internal space via the connector while the container is being emptied.

The physical state of the objects (typically particles, preferably submicron particles) in the internal space can be changed after filling, preferably by the means for changing the physical state of the objects as mentioned above, in situ in the internal space.

These means are preferably contained in the internal space. These means preferably form part of the container. The state of the objects (typically particles, preferably submicron particles) is preferably changed while the filling and emptying valves are closed.

It is possible to use a container according to the invention the filling valve of which is equipped with an inflatable seal, and this seal can be inflated after filling but before transporting the container.

It is possible to use a container according to the invention the filling valve of which is equipped with an inflatable seal and the emptying valve of which is equipped with an inflatable seal, and both these seals are preferably inflated during transport.

It is possible to use a container according to the invention the emptying valve of which is equipped with an inflatable seal, and this seal can be deflated after transporting the container but prior to the emptying step.

It is also possible to use a container according to the invention the filling valve and/or emptying valve of which are equipped with clamping means as described above, and optionally additionally with means as described above for creating a vacuum in the space between its swivel plate and the cover (or casing) and/or with means as described above for monitoring the pressure in the space between the casing and the swivel plate, a vacuum preferably having been created in said space prior to the transport step via a quick connector.

Prior to transport, preferably a cover (or casing) is fixed on the filling valve and/or on the emptying valve, in such a way that this cover remains fixed throughout transport.

Prior to transport, preferably a vacuum is created (pumping to lower the pressure) in the space located between the cover of the filling valve and/or of the emptying valve respectively and the swivel plate of the filling valve and/or of the emptying valve respectively.

Moreover, a filling valve or emptying valve is proposed, having an open state allowing objects (typically particles, preferably submicron particles) to pass through it and a closed state preventing the objects from passing through it, said valve preferably being equipped with locking means arranged for locking the valve in its closed state and for preventing opening thereof when this valve is not connected to a filling pipe or emptying pipe, characterized in that it further comprises a swivel plate, which:
- when the valve is closed, is in a horizontal state and seals the valve,
- when the valve is open, is in a swiveled state with respect to its horizontal state so that it no longer seals the valve, and allows the objects to pass through, this valve further comprising:
- a seal arranged to be in contact with at least one part of the perimeter of the swivel plate when the plate is in its horizontal state so as to ensure hermeticity of the valve when this valve is closed, and
- means for inflating the seal against the swivel plate in its closed state.

This valve can further comprise:
- clamping means as described above,
- optionally with means for creating a vacuum between its swivel plate and the casing as described above,
- and/or optionally with monitoring means as described above for monitoring, from outside the container, the pressure in the space located between its swivel plate and the casing.

DESCRIPTION OF THE FIGURES AND EMBODIMENTS

Figure 1:
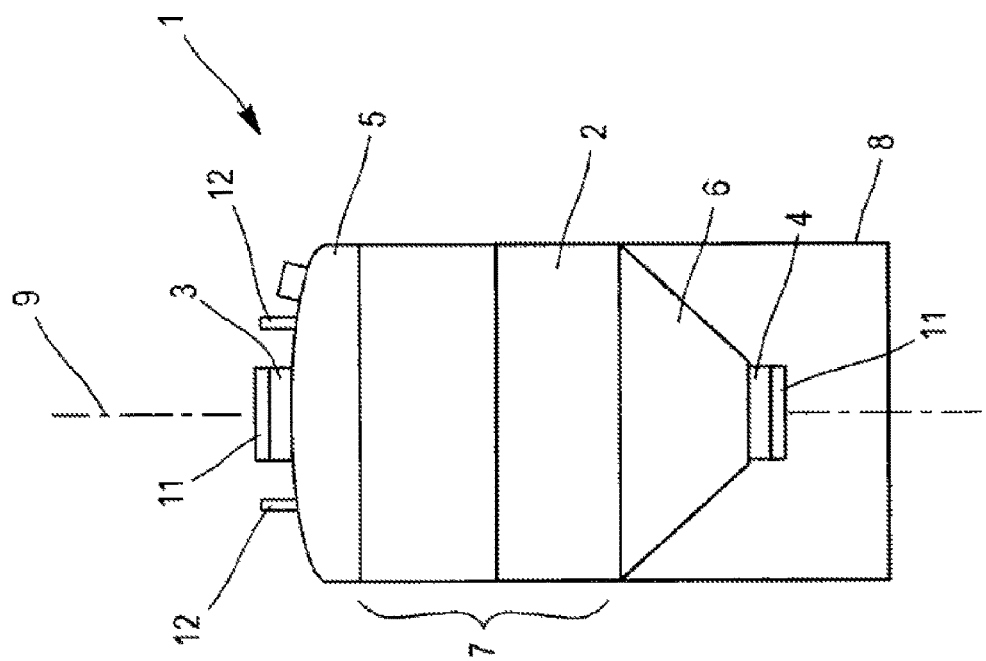
Figure 3:
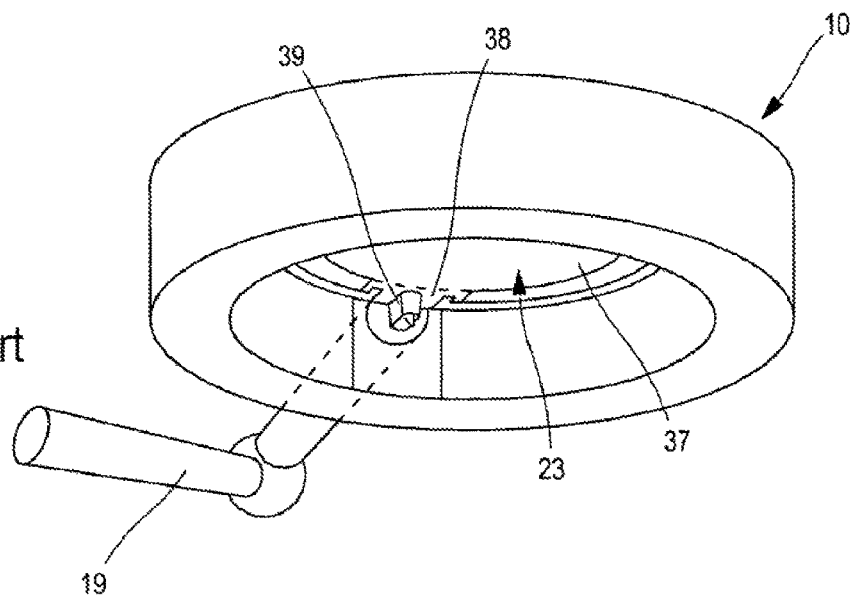
Figure 4:
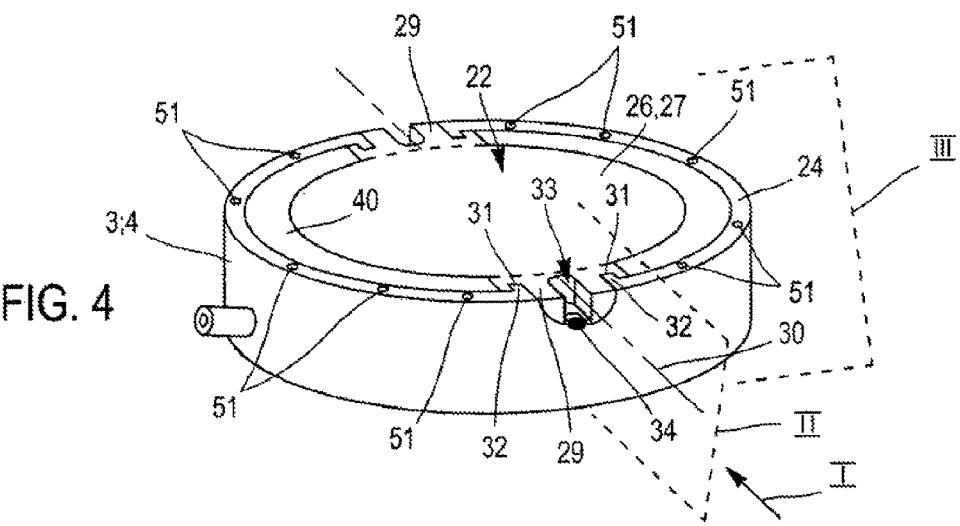
Figure 5:
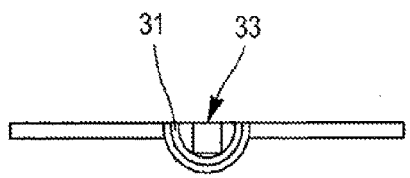
Figure 6:
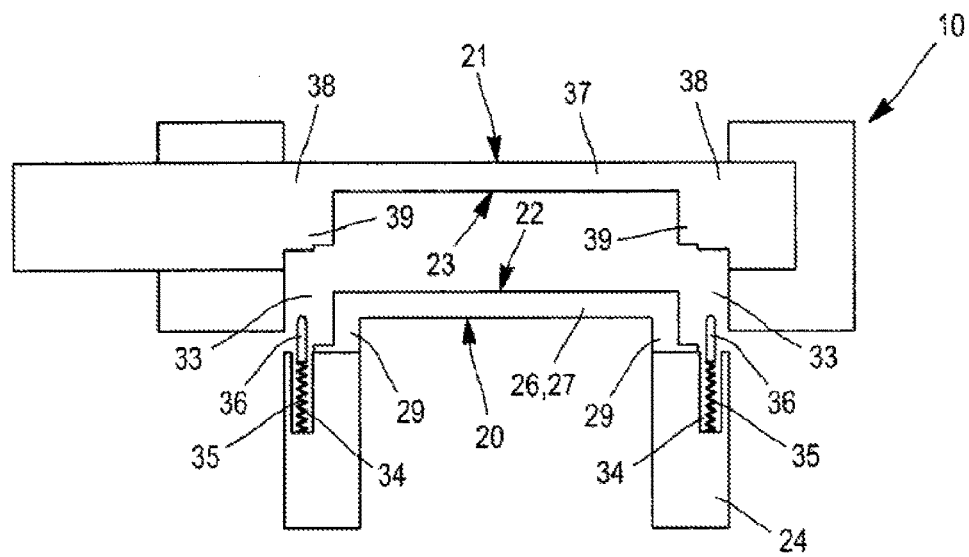
Figure 7:
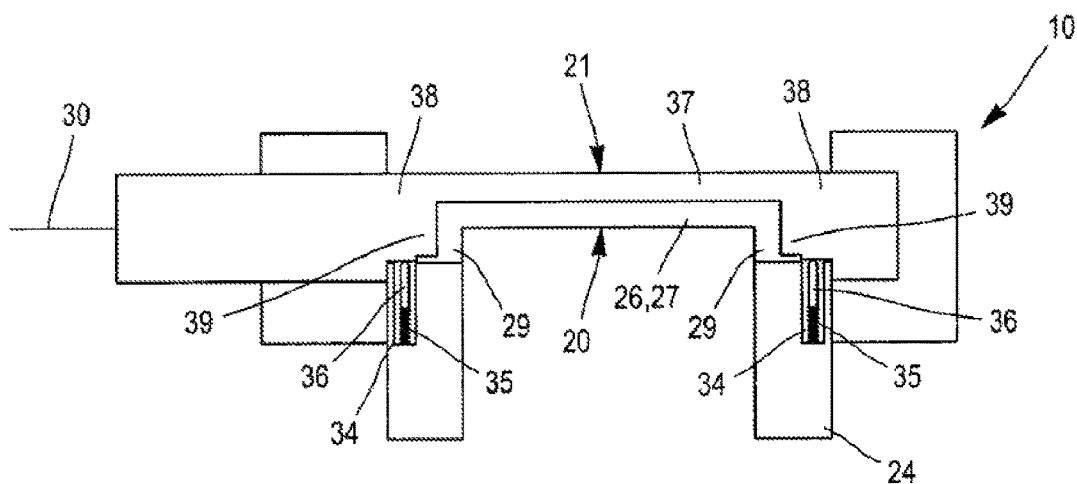
Figure 23:
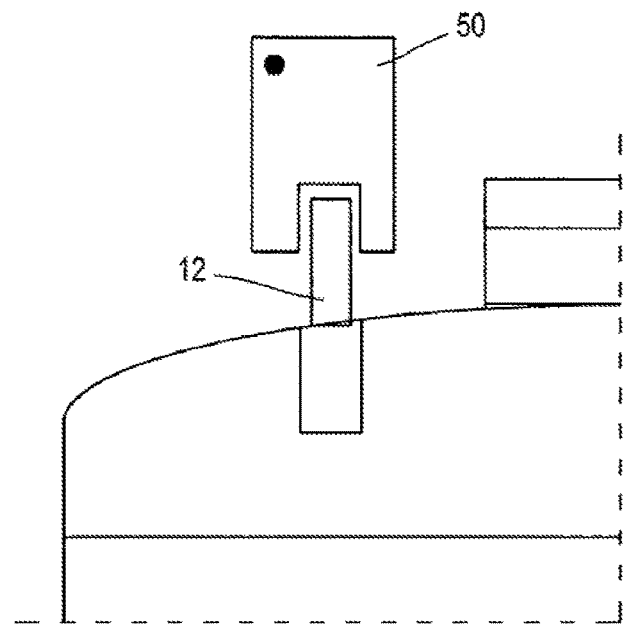
Figure 24:
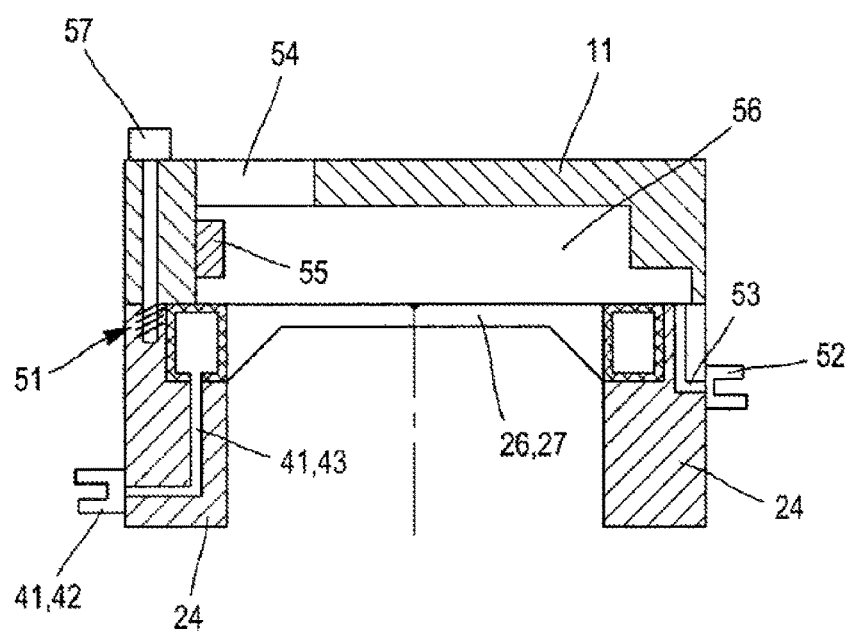

Other advantages and particular features of the invention will become clear on reading the detailed description of implementations and embodiments that are in no way limitative, and the following attached diagrams:

FIG. 1 is a side view of a preferred embodiment of the container according to the invention, FIG. 2 is a sectional side view of the container according to the invention of FIG. 1, FIG. 3 illustrates an "active" valve, according to the prior art, of a double-valve device, FIG. 4 illustrates a "passive" valve, according to the invention, of a double-valve device, FIG. 5 is a side view, along the viewing direction I of FIG. 4, of the swivel plate 26 of the valve shown in FIG. 4, FIG. 6 is a sectional side view, along plane II of FIG. 4, of the active valve of FIG. 3 and of the passive valve of FIG. 4 just before their coupling, FIG. 7 is a sectional side view, along plane II of FIG. 4, of the coupled active valve of FIG. 3 and passive valve of FIG. 4, FIGS. 8 and 9 are sectional side views, along plane III of FIG. 4, of the passive valve of FIG. 4 equipped with a first variant of the seal according to the invention, FIG. 10 is a sectional side view, along plane III of FIG. 4, of the passive valve of FIG. 4 equipped with a second (preferred) variant of the seal according to the invention, FIGS. 11A and 11B show respectively an inflated state and deflated state of the seal on a part IV of FIG. 10, FIGS. 12 to 22 show different steps of a process according to the invention for using a container according to the invention, FIG. 23 is an enlargement of the top left part of FIG. 1, and FIG. 24 is a sectional side view, along plane III of FIG. 4, of the passive valve of FIG. 4 equipped with a first variant of the seal according to the invention and with a casing for transporting the container according to the invention.

These embodiments and variants shown are in no way limitative, and it will in particular be possible to imagine variants of the invention that only comprise a selection of the features (means or steps) described below, isolated from the other features described, if this selection of features is sufficient to confer a technical advantage or to differentiate the invention with respect to the prior art. This selection preferably comprises at least one feature that is preferably functional (preferably without structural details), and/or only a part of the structural details if this part on its own is sufficient to confer a technical advantage or to differentiate the invention with respect to the prior art.

We shall first describe, with reference to FIGS. 1 to 11A and B, a preferred embodiment of container and of Nano-AirLock® "passive" valve according to the invention.

The container 1 is preferably a container for submicron particles.

More preferably, the submicron particles preferably consist of a nanopowder, preferably a nanopowder of silicon carbide (SiC).

By "submicron particles" is meant particles whose largest dimension (i.e. for each particle, the greatest distance joining two points of this particle) is less than a micrometre.

By "nanopowder" is meant a powder consisting of particles whose largest dimension is of some nanometres or some tens of nanometres at most, and typically less than 100 nanometres.

The container 1 according to the invention comprises:
- an internal space 2 for storing the submicron particles, with a typical capacity of 500 litres,
- a filing valve 3 for filling with the submicron particles, having an open state connecting the internal space 2 to the exterior of the container and allowing the submicron particles to pass through the filing valve between the internal space 2 and the exterior of the container, and a closed state preventing the submicron particles from entering or leaving the internal space 2 through the filing valve, said filling valve 3 being equipped with locking means arranged for locking the filling valve 3 in its closed state and for preventing opening thereof when this filling valve 3 is not connected to a filling pipe 45, and for unlocking the opening of the filling valve 3 when this filling valve 3 is connected to the filling pipe, a emptying valve 4 for emptying the submicron particles, having an open state allowing the submicron particles to pass through the emptying valve between the internal space 2 and the exterior of the container and connecting the internal space 2 to the exterior of the container and a closed state preventing the submicron particles from entering or leaving the internal space 2 through the emptying valve, said emptying valve 4 being equipped with locking means arranged for locking the emptying valve 4 in its closed state and for preventing opening thereof when this emptying valve 4 is not connected to an emptying pipe 46, and for unlocking the opening of the emptying valve 4 when this emptying valve 4 is connected to the emptying pipe.

The internal space 2 is delimited by:

an upper part 5 of a wall, preferably of concave shape on the side of the internal space 2 and preferably of stainless steel, a lower part 6 of a wall, preferably of stainless steel and preferably of conical shape to allow easy emptying of the contents of the container by gravity via the emptying valve 4; its inside surface is preferably treated by electrolytic polishing, and between the upper part 5 and the lower part 6, a main part 7 of a wall, also called main body, which is preferably of stainless steel; its inside wall preferably has a finish obtained by electrolytic polishing on its inside surface so as to limit the deposition of particles on its wall.

The upper 5 and lower 6 parts are welded to the main part 7.

These parts 5, 6, 7 are fixed on a stackable chassis 8.

The container 1 is a movable container. It is not inseparable from an industrial system such as a system for the production of submicron particles or for using submicron particles. The valves 3 and 4 are "free", i.e. they are not necessarily fixed to something else. The container 1 can be moved on its own, without these valves 3 and 4 being fixed to something external to the container such as a filling or emptying pipe.

Each of the filling 3 and emptying 4 valves is a passive valve of the "Buck®" type (for example such as marketed by the company GEA Process Engineering Division) but modified with an inflatable seal as explained below.

The filling valve 3 is fitted on the upper part 5.

The emptying valve 4 is fitted on the lower part 6 diametrically opposite the upper part 5.

Thus, the emptying valve 4 and the filling valve 3 are separate. This makes it possible to reduce the number of steps of handling the container, as this avoids having to invert the heavy container between its filling and its emptying. Moreover, this makes it possible to optimize in different ways (respectively for filling and for emptying) the two valves 3 and 4 and the shape (concave or conical respectively) of the parts 5 and 6 respectively carrying these valves.

The emptying valve 4 and the filling valve 3 are located on two opposite sides 6 and 5 respectively of container 1 with respect to the internal space 2.

The valves for filling 3 and for emptying 4 are positioned and aligned on the vertical axis 9 of the container respectively on its upper part 5 for providing filling and its lower part 6 for providing emptying. These "passive" valves 3, 4 preferably have the same diameter, for example 250 mm, and are closed by default, thus ensuring perfect hermeticity of the container 1 and can only be opened once they are connected to an "active" valve 10 of a filling pipe 45 present on the production pipe of the supplier of powder for filling the container and to an "active" valve 10 of an emptying pipe 46 present at the customer for emptying the container.

The container 1 comprises means for clamping a cover 11 on the filling valve and/or on the emptying valve.

The clamping means comprise holes 51 provided with screw threads and arranged in the periphery 24.

Of course, the cover 11 has to be removed from the valve 3 or 4 for the latter to be used. More precisely, each valve 3, 4 is protected by a casing 11 to preserve its operational state and to guarantee hermeticity in all circumstances (for example in the case of impact during transport of the container 1). The valves respectively for filling or emptying the container 1 are each equipped with means for hermetic clamping of each casing by means of a seal on the swivel plates of the valves for filling or emptying respectively.

The container 1 comprises means 12 for connecting to a source of fluid arranged for injecting this fluid (preferably a liquid) into the internal space 2. These means 12 are located on the same side as the filling valve 3. The means 12 are therefore located closer to the filling valve 3 than to the emptying valve 4. The means 12 are arranged so that the fluid injected by the means 12 flows into the container in one and the same average direction as the direction of flow of the particles through the filling valve 3. The means 12 comprise at least one male or female connector 12 arranged to be open to allow passage of fluid through this connector between the internal space and the exterior of the container when it is connected to a complementary connector, female or male respectively, of a source or discharge of fluid and to be closed to prevent passage of fluid through this connector between the internal space and the exterior of the container when it is not connected to the complementary connector of the source or discharge of fluid. Each connector 12 is separate from the filling valve 3 and the emptying valve 4.

Each male or female connector 12 is fitted on the upper part 5. Each connector 12 disconnected from a complementary connector is in the closed position and each connector 12 connected to a complementary connector is in the open position. Each connector is a "quick" connector with high hermeticity to vacuum and low leakage rate, and preferably has a diameter between 4 and 20 mm. Each connector 12 can allow gases or liquids to pass through. A possible supplier for each connector is the company Stäubli, in particular from its "quick" connector range. Each connector 12 allows gas or liquids to be introduced into the container. Each connector 12 also allows fluid to be pumped from the internal space 2.

As shown in FIG. 23, each male or female connector 12 can be connected (preferably during transport of the container 1) to a safety valve 50 equipped with a complementary connector, female or male respectively, so as to form a system arranged to open when there is a pressure difference between the internal space and the exterior of the container above a threshold (typically between 100 and 500 mbar, preferably roughly equal to 300 mbar).

Each connector 12 is separate from the filling valve 3 and the emptying valve 4.

The means 12 for connection to a source of fluid are located closer to the filling valve 3 than to the emptying valve 4. In the case of liquid, at least one connector 12 is equipped with a nozzle 13 placed in the internal space 2 for providing spraying of liquid on particles contained in the internal space 2, for example for putting them in suspension. Thus, the fluid can be sprayed correctly, which would not be case if the nozzle were located on the side with the emptying valve and if the particles were packed against the nozzle.

The valves 3 and 4 and each connector 12 are fitted in such a way as to comply with the ADR standard for the transport of hazardous materials.

The container 1 generally comprises means for changing, in situ in the internal space, the physical state of the submicron particles contained in the internal space 2.

The means for changing the state of the submicron particles in situ in the container comprise:

- means 14 for emitting ultrasound within the internal space; these emitting means can for example comprise one or more submersible ultrasound transducer/emitter rods of identical or different frequencies and with power suitable for the internal space 2, for the nature of the particles contained in the volume 2, and for the concentration of the suspension of particles to be treated. Emitters of the "PushPull" type may be suitable (possible supplier: Martin Walter). In one variant, these rods are integral parts of the container; in another variant these rods are only introduced into the container after liquid has been injected via a connector 12. These ultrasound emitting means are preferably introduced via the top flange on which the "passive" filling valve 3 is fitted. The rods are distributed so as to ensure the most uniform possible treatment of the suspension, this treatment having the aim of ensuring optimum dispersion of the particles with respect to one another; and/or.
- means for mechanically mixing the submicron particles in the internal space 2; the mixing means are located closer to the emptying valve 4 than to the filling valve 3, and are typically located in the internal space 2 at the level of the aperture of the emptying valve 4; these mixing means typically comprise an helix 15 for providing mechanical mixing of the suspension of particles contained in the internal space 2; these mixing means 15, coupled to the means 14 for emitting ultrasound, make it possible to homogenize the treatment of the suspension and/or to mix the particles to facilitate emptying thereof via the valve 4; and/or
- means 16 for heating or drying the submicron particles within the internal space 2; these means 16 typically comprise heating resistances for the in-situ drying of the suspension contained in the internal space 2 with the purpose of forming very compacted dry matter if necessary with additives precipitated chemically on the surface of the grains during the step of placing in suspension.

The fact that the emptying valve 4 and the filling valve 3 are separate means it is possible to equip the emptying valve 4 with the helix 15 to facilitate emptying of the particles, but without obstructing valve 3 for filling with particles.

The container 1 further comprises means 17 for measuring at least one physical parameter (pH and/or zeta potential, and/or temperature and/or pressure etc.) of the submicron particles within the internal space. These measuring means typically comprise a sensor for measuring:

- preferably the pH and/or the zeta potential of the aqueous suspension formed in space 2 after spraying a liquid; and/or
- the temperature of the contents of space 2; and/or
- the pressure within space 2.

Preferably the sensor 17 is introduced via a flange 18 located on the upper part 5 of the container, permanently (or in one variant, only once the liquid has been injected into the container).

The fact of being able to change the state of the particles or being able to measure a parameter while the container is closed makes it possible to isolate the particles from the exterior of the container and avoids a step of transferring the particles outside of the container for changing their state or for measuring a parameter thereof; this therefore makes it possible both to improve the hermeticity and safety of the process implemented with the container according to the invention and moreover makes it possible to reduce the number of steps of handling the particles.

The container 1 is arranged for being filled and for being emptied via a double-valve device comprising valve 3 (and valve 10) for filling and valve 4 (and valve 10) for emptying.

Each valve 3 and 4 according to the invention of the container 1 will now be described in more detail. As these valves 3, 4 are identical in respect of their general principle, the following description thereof will be made without distinction (the expression "valve 3; 4" signifying "valve 3 or valve 4 respectively").

The "passive" valve 3; 4 is arranged to be coupled to a filling or emptying pipe comprising an "active" pipe valve 10 equipped with a swivel plate 37 so as to form a double butterfly valve device, the locking means being arranged so as to unlock the opening of the valve 3; 4 when the swivel plate 37 of the pipe valve 10 is coupled to the swivel plate 26 of the valve 3; 4.

As explained above, the double-valve device comprises an "active" valve 10 not forming part of the container 1 and a "passive" valve 3; 4 forming part of the container 1.

Valve 10 is called "active" as it comprises means 19 (typically a handle) for operating the opening of valves 10 and 3; 4 once these valves are coupled. This valve 10 is preferably different for filling and for emptying.

Valve 3; 4 is called "passive" as it does not comprise such opening actuation means.

Valves 10 and 3; 4 close independently of one another and hermetically.

However, these valves 10 and 3; 4 can only be opened when they are coupled to one another: opening of the double-valve device (i.e. the combined and simultaneous opening of valves 10 and 3; 4) can only take place when the two valves 10 and 3; 4 are coupled to one another, i.e. when the valves 10 and 3; 4 are combined so as to unlock the locking means of the valve 3; 4. In the absence of coupling, the command for opening is blocked.

In this way, the inside faces 20, 21 of valves 3; 4 and 10, which are in contact with the particles, are never in contact with the outside atmosphere breathed by the user.

Conversely, the outside faces 22, 23 of valves 3; 4 and 10 are in contact with the outside atmosphere breathed by the user when the valves 3; 4 and 10 are uncoupled but are joined together when valves 3; 4 and 10 are coupled, which prevents the particles soiling these outside faces.

The structure and the locking/unlocking of valve 3; 4 will now be described in more detail.

Valve 3; 4 comprises a periphery 24 typically of stainless steel. The periphery delimits an opening hole 25 of valve 3; 4; the particles can pass through this hole when valve 3; 4 is open.

Valve 3; 4 comprises a swivel plate 26.

When valve 3; 4 is closed, this swivel plate 26 is in a horizontal state 27 and seals the opening hole of valve 3; 4.

When valve 3; 4 is open, this swivel plate 26 is in a swiveled state 28 with respect to its horizontal state so that it no longer seals the opening hole 25 of valve 3; 4 and allows the submicron particles to pass through this hole.

The periphery 24 supports the swivel plate 26. More precisely, the periphery 24 supports two rotation half-shafts 29 (roughly in the form of a half-cylinder) integral with the swivel plate 26. The half-shafts are diametrically opposite with respect to the swivel plate 26 and are arranged so that they can swivel within the periphery 24 about a common axis of rotation 30. For each half-shaft 29, rotation about the axis 30 takes place by rotation of a groove 31 in a circular arc (hollowed-out in the half-shaft) on a rail 32 in a circular arc integral with the periphery 24.

Each half-shaft 29 is in addition provided with a hole 33.

At the level of each half-shaft 29, the periphery 24 is provided with a housing 34 comprising a spring 35 that pushes a pin 36 (not shown in FIG. 4 so as to be able to make out the housing 34) integral with spring 35, out of the housing.

For each pair of associated hole 33 and housing 34, when valve 3; 4 is closed and is not coupled to the active valve 10 (as shown in FIG. 6), the pin 36 comes out of its housing 34 and passes through hole 33 of half-shaft 29 so as to immobilize half-shaft 29 and prevent it rotating.

Thus, the locking means comprise at least one pin 36 blocking the rotation of the swivel plate 26 when valve 3; 4 is closed and is not coupled to the active valve 10.

The active valve 10 is structured similarly with a swivel plate 37 integral with half-shafts 38 diametrically opposite. Each half-shaft 38 carries a projection 39 complementary in shape to each hole 33.

As shown in FIG. 7, when the valves 10 and 3; 4 are coupled, the outside faces 22, 23 of valves 3; 4 and 10 are joined together.

As shown in FIG. 7, the whole is arranged so that, when the valves 3; 4 and 10 are coupled, each projection 39 goes into a hole 33 so as to push a pin 36 back into its housing 34 and thus release the rotation of the half-shafts 29 (and 38) and therefore of the swivel plates 26 (and 37).

Thus, coupling of the two valves 10 and 3; 4 makes it possible to release the locking, and the plates 26, 37 (also called flaps or butterflies) can swivel under the action of the handle 19.

Valve 3; 4 further comprises an inflatable seal 40 preferably of rubber.

The seal is carried by the periphery 24.

The seal 40 is arranged so that it is in contact with at least one part of the perimeter of the swivel plate 26 when plate 26 is in its horizontal state so as to ensure hermeticity of valve 3; 4 when valve 3; 4 is closed.

Valve 3; 4 further comprises means 41 for inflating and deflating seal 40, typically for inflating seal 40 against the swivel plate 26 in its closed state.

The means 41 are arranged for inflating seal 40 (FIG. 11A) against swivel plate 26 when valve 3; 4 is closed (FIGS. 8 and 10). This improves the hermeticity of valve 3; 4 when it is closed. The mechanical durability of valve 3; 4 in the closed position and its hermeticity are improved, and it is made usable for higher pressure differences with the exterior of the container and it can withstand higher temperatures. Valve 3; 4 and therefore the container according to the invention have better hermeticity than according to the prior art, in particular for pressure differences between the internal space 2 and the exterior of the container for example up to at least 1000 mbar, or even at least 1500 mbar.

The means 41 are arranged for deflating seal 40 (FIG. 11B) from against the swivel plate 26 before opening valve 3; 4. Thus, the swivel plate 26 is released from the pressure of seal 40, in order to allow its rotation and the opening of valve 3; 4 (FIG. 9).

The inflating and deflating means 41 comprise:
a male or female connector 42, and
a pipe 43 connecting the connector 42 to the seal 40.

The male or female connector 42 is arranged:
to be open when it is connected to a complementary connector, female or male respectively, of a source or discharge of fluid to allow passage of this fluid between pipe 43 and this complementary connector so as to inflate seal 40 by the source of fluid or to deflate it in the discharge of fluid, and
to be closed when it is not connected to this complementary connector, female or male respectively, to prevent this passage of this fluid between pipe 43 and this complementary connector so that the state of inflation of the seal remains unchanged.

The fluid for inflating the seal is a gas, preferably air or nitrogen.

In FIGS. 8, 9 and 10, the seal is shown on the left and on the right of these figures as it has approximately symmetry of revolution about axis 9.

In a first variant (shown in FIGS. 8 and 9), the seal 40 is a hollow seal. The pipe 43 is connected to the hollow interior of the seal so as to permit inflation of the profile of the seal.

In a second variant (shown in FIGS. 10, 11A and 11B), pipe 43 opens onto the seal 40 forming a channel 44 which surrounds the seal 40, preferably over the whole perimeter between the seal 40 and the periphery 24. In this way, pipe 43 is arranged in order to allow inflation of seal 40 (FIG. 11A) towards the interior of valve 3; 4, i.e. against the swivel plate 26 when valve 3; 4 is closed (typically towards the central axis 9 of valve 3; 4).

Thus, the means 41 are arranged for inflating the seal 40 by inflating an intermediate space (channel 44) between the seal 40 and a part of valve 3; 4 (periphery 24) on which the seal 40 is held.

Preferably, the container 1 contains submicron particles in its internal space, preferably nanopowders preferably of silicon carbide (SiC). More preferably, the container contains submicron particles (preferably nanopowders preferably of silicon carbide (SiC)) in its internal space occupying a volume of at least 70% of the volume of its internal space 2.

With reference to FIG. 24, valve 3; 4 is equipped with clamping means 51 for hermetically clamping, by means of a seal (not shown), a casing 11 on its swivel plate in its closed state.

The clamping means comprise holes 51 provided with screw threads and arranged in the periphery 24.

The casing 11 is fixed by tightening several screws, each screw passing through the casing 11 and screwed into one of the holes 51.

Of course, this casing 11 is unclamped and removed so as to allow coupling of the valve 3; 4 to the valve 10.

In contrast, this casing 11 is clamped onto the valve 3; 4 during transport of the container.

Valve 3; 4 is provided with means 52 (connector 52, identical to connector 42 but opening into a pipe 53 and not 43) in order to create a vacuum between its swivel plate 26 and the casing 11 (when the latter is clamped) for example by means of a quick connector 52 connected to a pump.

Valve 3; 4 comprises monitoring means 55 for monitoring the hermeticity between casing 11 (when the latter is clamped) and its closed swivel plate 26. These monitoring means can be a small pressure gauge 55 or a chip 55 comprising a powder the colour of which changes as a function of the pressure, the chip or gauge being visible from the exterior through a small inspection window 54 and in contact with the space 56 located between the casing and the swivel plate. Thus, once the clamp is closed and the space between the casing and the swivel plate has been pumped out, the colour of the chip assumes a hue A. This hue remains stable for as long as the vacuum is maintained and changes colour if the vacuum between the casing and the swivel plate is broken, for example following an impact during the transport phase. Preferably the powder produces a reversible effect as a function of the pressure: when the colour becomes B following ingress of air, it becomes A again when the pressure decreases again, for example after the space is pumped out again. The indicator can also be constituted by a membrane visible from outside the container, which bursts if air enters the space in question.

An embodiment of a process according to the invention for using a container 1 according to the invention will now be described, with reference to FIGS. 12 to 22.

In this process, with reference to FIGS. 12 to 17, the container 1 is filled with nanometric particles, via its filling valve 3. The container is preferably filled with dry particles, i.e. not in solution.

Filling is typically carried out at a filling site.

Filling typically proceeds in the following manner.

As shown in FIG. 12, a hopper 45 (i.e. the filling pipe) closed at its bottom end by the active valve 10, 10a of the "buck®" type will be positioned so as to connect it to the passive filling valve 3 located on the upper part 5 of the container 1. Valve 3 and valve 10, 10a are brought into contact, their axes being perfectly aligned. Valves 3 and 10, 10a are connected hermetically.

Thus, valves 10, 10a and 3 are connected hermetically, while they are closed. The swivel plates 26 and 37 are closed, i.e. each in its horizontal position. This is the configuration shown in FIG. 13.

The complementary parts, male or female respectively, will be connected to the quick connectors 12, female or male respectively, allowing pumping of the interior of the container (and of space 2) then injection of a gas 49 into the container (into space 2), either before (as shown in FIG. 12) or after (as shown in FIG. 13) connecting the valves 10, 10a and 3. This gas 49 is a neutral gas.

It is important that valves 3 and 4 withstand large pressure differences between the internal space 2 and the exterior of the container, in particular during these steps of pumping and of injection of gas 49, for which pressure differences of up to 900 mbar are typically reached.

The container is pumped via connector 12, and is then flushed with the neutral gas 49 such as nitrogen before it is filled with nanopowders. It is a question of evacuating the air to the maximum possible extent.

Then, as shown in FIG. 14, the submicron particles 47 (shown in black), after production, are injected into the hopper 45 by various means that are possible for a person skilled in the art.

The seal 40 of valve 3 is deflated via its connector 42.

Then, as shown in FIG. 15, the swivel plates 26 and 37 of valves 3 and 10, 10a respectively are swiveled together. While they swivel, these plates 26 and 37 are in contact with one another and swivel about an axis perpendicular to axis 9 of the container. While they swivel, plates 26 and 37 carry out a movement of rotation through an angle of 90° causing the opening of the lower part of the hopper 45 and of the upper part 5 of the container 1. This results in filling the container by gravity, the contents of the hopper pouring out from within it.

Then, as shown in FIG. 16, the plates 26 and 37 swivel in the opposite sense through 90° so as to isolate the hopper 45 from the container. The lower part of the hopper 45 is therefore closed again and so is the upper part 5 of the container.

Then, the seal 40 of the valve 3 is inflated via its connector 42 as described above.

Next, the two valves 3 and 10, 10a are decoupled as shown in FIG. 17, the active valve 10, 10a remaining integral with the hopper 45.

After filling the container, with reference to FIGS. 18 to 19, optionally the physical state of the particles 47 contained in the internal space 2 of the container 1 is changed, preferably while valves 3 and 4 are closed. The fact of being able to change the state of the particles while the container is closed makes it possible to isolate the particles from the exterior of the process or avoids a step of transferring the particles outside of the container in order to change their state; this therefore makes it possible to improve both the hermeticity and the safety of the process implemented with the container according to the invention and moreover makes it possible to reduce the number of steps of handling the particles.

Typically, the physical state of the particles is changed from a solid or dry state to a liquid state or a state in solution.

As shown in FIG. 18, the complementary parts, male or female respectively, will be connected to the quick connector 12, female or male respectively, allowing a liquid 48, for example water, to be injected into the container 1. The liquid is sprayed into the container via the nozzle 13 so as to wet the particles 47 and then transform them into a state in solution.

It is possible to add additives in the liquid 48 so as to promote dispersion of the particles 47 with respect to one another in the liquid, the additives used depending on the liquid used and the nature of the particles and in particular their surface chemistry. Dispersants can in particular be used for ensuring dispersion of the particles by a steric or electrostatic effect, or even by both effects. It is also possible by this means to graft new molecules and/or chemically precipitate new phases on the surface of the particles that are useful for the application envisaged.

Then, as shown in FIG. 19, an active valve 10, 10b (preferably an active valve 10 other than the valve 10, 10a shown above for emptying particles) will be connected to valve 3, this active valve 10, 10b being connected to a device of detachable ultrasound rods 14. Once the two valves 3 and 10, 10b are connected (i.e. coupled), opening by swiveling is carried out again, after deflating seal 40 of valve 3 via its connector 42, and the ultrasound rods 14 are introduced into the liquid 48 containing the particles 47.

Then, still as shown in FIG. 19, the rods 14 are supplied with electric power and helix 15 is connected to an external motor that will drive it. Then the mechanical mixing is operated so that it alternates with the ultrasound for optimum dispersion of the particles 47 with respect to one another and thus homogeneously. The mixing makes it possible to circulate the liquid near the rods and provide optimum treatment in situ in container 1.

It should be noted that in the variant or variants:
in which the rods 14 are not introduced into the space 2 via a valve 10b but form an integral part of the container, ultrasound can be emitted while valve 3 is closed, and/or in which the helix 15 is equipped with a motor forming part of container 1, this motor can be supplied electrically by simple electrical connection of container 1 to an external power source.

The acidity of the liquid suspension, especially in the case of an aqueous suspension, can be monitored by the submerged pH sensor 17, which will in particular make it possible to adjust the injection of dispersants.

It is also possible to connect a viscosity measuring device 17 making it possible to take samples of the suspension for continuous analysis of its viscosity.

Then, the valves 3 and 10b are closed.

Then, the seal 40 of valve 3 is inflated via its connector 42.

Then both valves 3 and 10, 10b are decoupled.

Then, the casing 11 is clamped on the valve 3 prior to transport of the container. In fact, throughout all the preceding steps, the casing 11 was not clamped on the valve 3.

Throughout the preceding steps, the other casing 11 remained clamped on the valve 4.

Then, the container is transported to an emptying site remote from the filling site, whereas its valves 3 and 4 are not connected or coupled to complementary valves 10 but are inflated.

During transport, at least one of the connectors 12 is connected to safety valve 50, for safety reasons, in particular in case of increase of temperature and therefore of pressure in the container 1.

During transport, the pressure within the container is of the order of 1000 mbar, and so is very close to atmospheric pressure.

Throughout the next steps, the casing 11 remains clamped on the valve 3.

However, the other casing 11 is removed (declamped) from the valve 4.

Finally, with reference to FIGS. 20 to 22, the submicron particles are emptied from container 1 via its emptying valve 4.

Emptying typically takes place at the emptying site.

The container is preferably emptied with particles in solution.

As shown in FIG. 20, an active valve 10, 10c, integral with emptying pipe 46 into which it is wished to inject the suspension of particles, will be positioned on the emptying valve 4 located on the lower part 6 of the container. Thus the valves 4 and 10c are connected (i.e. coupled).

Then, as shown in FIG. 21, the complementary parts, male or female respectively, will be connected to the quick connector 12, female or male respectively, for injecting a gas 49 into the container. This gas 49 can be, for example, air or a neutral gas. This makes it possible to balance the pressures between the interior of the container and the process or the pipeline 46 into which the powders are injected.

Then, the seal 40 of valve 4 is deflated via its connector 42.

Still as shown in FIG. 21, the double-valve device 4, 10c is opened as before by swiveling the plates 26, 37 into contact. The two plates 26, 37 are in contact and are swiveled together, which causes the opening of the container on the pipe 46 allowing the particles (in suspension) to be injected into the pipe 46. These particles 47 then flow into the system.

Then, as shown in FIG. 22, plates 26, 37 are swiveled in the opposite sense so as to close the container and the pipe 46 again, simultaneously. Then, the seal 40 of valve 4 is inflated via its connector 42 and the two valves 4, 10*c* are decoupled, and the container 1 is free for reuse.

In variants of the process according to the invention that have just been described, the change of state of the particles can take place at any moment, for example before and/or after transport of the container.

In variants of the process according to the invention that have just been described, the change of state of the particles can comprise heating (typically via means 16) of the solution of particles 47 (preferably while valves 3 and 4 are closed). Said heating can be carried out so as to evaporate the liquid 48 so that the particles 47 contained in space 2 are dry. Thus, the particles 47 can be made more compact relative to a dry state prior to dissolution of them. After said heating/drying, filling container 1 can be completed by the same principle as described with reference to FIGS. 15 and 16.

Thus, in a clever way, it is possible for example to:

dry the particles in the container at the filling site for compacting them, and then complete the filling, then optionally cause the particles in the container to pass from a dry state to a state in solution only once at the emptying site, so as to facilitate flow of the particles during emptying thereof while limiting the weight of the container without liquid for transport.

Of course, the invention is not limited to the examples that have just been described, and numerous adjustments can be made to these examples without exceeding the scope of the invention.

For example, the order of the steps of the process according to the invention can be changed. For example, for filling, the seal 40 can be inflated after or before decoupling valves 3 and 10*a*.

The state of the particles (FIGS. 18 and 19) can also be changed after transporting the container.

Of course, the various features, forms and embodiment variants of the invention can be combined with one another in various combinations, provided that they are not incompatible or exclusive of one another.

The invention claimed is:

1. A process for using a container (1) for submicron particles, the container comprising:

an internal space (2) for storing the submicron particles, a filling valve (3) for filing the submicron particles, the filling valve (3) having i) an open state allowing the submicron particles to pass through the filling valve between the internal space and the exterior of the container and ii) a closed state preventing the submicron particles from entering or leaving the internal space through the filling valve, said filling valve being equipped with locking means (33, 34, 35, 36) arranged for locking the filling valve in the closed state and for preventing the opening thereof when the filling valve is not connected to a filling pipe (45), an emptying valve (4) for emptying the submicron particles, the emptying valve (4) having i) an open state allowing the submicron particles to pass through the emptying valve between the internal space and the exterior of the container and ii) a closed state preventing the submicron particles from entering or leaving the internal space through the emptying valve, said emptying valve being equipped with locking means (33, 34, 35, 36) arranged for locking the emptying valve in the closed state and for preventing the opening thereof when the emptying valve is not connected to an emptying pipe (46), and a connector (12) arranged in order to be open to allow passage of fluid through the connector between the exterior of the container and the internal space when the connector is connected to a complementary connector of a source or discharge of fluid and to be closed to prevent passage of fluid through the connector between the internal space and the exterior of the container when the connector is not connected to the complementary connector of the source or discharge of fluid, the process comprising the following steps:

the container is filled with the submicron particles (47) via the filling valve (3), at a filling site, then the container is transported to an emptying site remote from the filling site, then the submicron particles are emptied from the container via the emptying valve (4), at the emptying site, wherein the container is filled (1) with dry particles, and injection of liquid (48) into the internal space (2) via the connector (12) prior to the emptying step.

2. The process according to claim 1, wherein, before filling the container with particles, the internal space (2) is emptied via the connector (12), then the internal space (2) is flushed with neutral gas via the connector (12).

3. The process according to claim 1, wherein the physical state of the submicron particles is changed in the internal space (2) after filling.

4. The process according to claim 1, wherein the injection of liquid (48) is done at the emptying site.

5. The process according to claim 1, further comprising a step of balancing pressures between the interior of the container and the emptying pipe (46) into which the particles are injected, by injecting a gas (49) into the internal space (2) via the connector (12) while the container is being emptied.

6. The process according to claim 5, wherein the gas (49) injected into the internal space (2) via the connector (12) while the container is being emptied is air.

7. The process according to claim 3, wherein the physical state of the submicron particles is changed in the internal space (2) after filling by means (12, 13, 14, 15, 16) forming part of the container.

8. The process according to claim 3, wherein the physical state of the submicron particles is changed in the internal space (2) after filling while the filling valve and the emptying valve are closed.

9. The process according to claim 3, wherein the container comprises means (12, 13, 14, 15, 16) for changing the physical state of the submicron particles, in situ in the internal space.

10. The process according to claim 9, wherein the means for changing the state of the submicron particles in situ in the container comprise means (14) for emitting ultrasound within the internal space.

11. The process according to claim 9, wherein the means for changing the state of the submicron particles in situ in the container comprise mixing means (15) for mixing the submicron particles in the internal space.

12. The process according to claim 11, wherein the mixing means are located closer to the emptying valve than to the filling valve.

13. The process according to claim 9, wherein the means for changing the state of the submicron particles in situ in the container comprise means (16) for heating or drying the submicron particles within the internal space.

14. The process according to claim 1, wherein at least one of the filling valve and the emptying valve comprises a swivel plate (26) , which:

when the filling valve or the emptying valve respectively is closed, is in a horizontal state and seals the filling valve or the emptying valve respectively, when the filling valve or the emptying valve respectively is open, is in a swivelled state with respect to its horizontal state so that it no longer seals the filling valve or the emptying valve respectively, said respectively filling valve or emptying valve respectively further comprising:

a seal (40) arranged to be in contact with at least one part of the perimeter of the swivel plate of respectively the filling valve or the emptying valve when the swivel plate of respectively the filling valve or the emptying valve is in its horizontal state so as to ensure hermeticity of the filling valve or the emptying valve respectively when this valve is closed, and means (41, 42, 43) for inflating the seal of respectively the filling valve or the emptying valve against the swivel plate of respectively the filling valve or the emptying valve in its closed state.

15. Process according to claim 14, wherein for each seal of that of the filling valve and/or of the emptying valve, the means for inflating this seal of respectively the filling valve or the emptying valve are:

arranged in order to inflate the interior of the seal of respectively the filling valve or the emptying valve, this seal being hollow, or arranged in order to inflate the seal (40) of respectively the filling valve or the emptying valve against the swivel plate of respectively the filling valve or the emptying valve by inflating an intermediate space (44) between the seal (40) of respectively the filling valve or the emptying valve and a part (24) of the valve on which this seal (40) is held.

16. The process according to claim 14, wherein the filling valve (3) is equipped with an inflatable seal (40), and this seal is inflated after filling but before transporting the container.

17. The process according to claim 14, wherein the filling valve (3) is equipped with its inflatable seal (40) and the emptying valve (4) is equipped with its inflatable seal (40), and both these seals are inflated during transport.

18. The process according to claim 14, wherein the emptying valve (4) is equipped with its inflatable seal (40), and this seal (40) is deflated after transporting the container but prior to emptying.

19. The process according to claim 14, wherein prior to transport, a cover (11) is fixed on the filling valve and/or on the emptying valve, in such a way that this cover remains fixed throughout transport.

20. The process according to claim 14, wherein prior to transport, a cover (11) is fixed on the filling valve and/or on the emptying valve, in such a way that this cover remains fixed throughout transport and wherein prior to transport, a vacuum is created in the space located between the cover (11) of the filling valve and/or of the emptying valve respectively and the swivel plate (26) of the filling valve and/or of the emptying valve respectively.

21. The process according to claim 19, further comprising, for one or both of the filling valve and the emptying valve, a step of creating a vacuum in the space located between the cover (11) and the swivel plate (26) of this valve and a step of monitoring and displaying, from outside the container, the pressure in the space located between the cover (11) and the swivel plate (26) of this valve.

22. The process according to claim 1, wherein the filling valve and the emptying valve are separate and the connector is located closer to the filling valve than to the emptying valve.

23. The process according to claim 1, wherein the connector is moreover connected to a safety valve arranged to open when there is a pressure difference between the internal space and the exterior of the container above a threshold.

24. The process according to claim 1, wherein the container comprises means (17) for measuring at least one physical parameter of the submicron particles within the internal space.

25. The process according to claim 1, wherein the emptying valve and the filling valve are located on two opposite sides of the container with respect to the internal space.

26. The process according to claim 20, further comprising, for one or both of the filling valve and the emptying valve, a step of creating a vacuum in the space located between the cover (11) and the swivel plate (26) of the filling valve and/or the emptying valve and a step of monitoring and displaying, from outside the container, the pressure in the space located between the cover (11) and the swivel plate (26) of this valve.

\* \* \* \* \*